(12) United States Patent
Filner et al.

(10) Patent No.: US 7,441,207 B2
(45) Date of Patent: Oct. 21, 2008

(54) METHOD AND SYSTEM FOR IMPROVED VIEWING AND NAVIGATION OF CONTENT

(75) Inventors: Aaron S. Filner, Seattle, WA (US); Jay F. McLain, Woodinville, WA (US); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 10/804,602

(22) Filed: Mar. 18, 2004

(65) Prior Publication Data

US 2005/0210399 A1 Sep. 22, 2005

(51) Int. Cl.
G06F 3/14 (2006.01)

(52) U.S. Cl. ............... 715/864; 715/794; 715/784; 715/819; 715/829

(58) Field of Classification Search ............. 345/792; 715/864, 794, 784, 819, 829
See application file for complete search history.

(56) References Cited

U.S. PATENT DOCUMENTS

| | | | |
|---|---|---|---|
| 6,700,612 B1 * | 3/2004 | Anderson et al. | 348/333.11 |
| 6,704,024 B2 * | 3/2004 | Robotham et al. | 345/581 |
| 6,734,909 B1 * | 5/2004 | Terane et al. | 348/333.05 |
| 6,832,353 B2 * | 12/2004 | Itavaara et al. | 715/744 |
| 2002/0033837 A1 * | 3/2002 | Munro | 345/654 |
| 2002/0186262 A1 * | 12/2002 | Itavaara et al. | 345/864 |
| 2004/0049541 A1 * | 3/2004 | Swahn | 709/203 |
| 2004/0174400 A1 * | 9/2004 | Herigstad et al. | 345/864 |
| 2004/0177323 A1 * | 9/2004 | Kaasila et al. | 715/513 |
| 2004/0239681 A1 * | 12/2004 | Robotham et al. | 345/581 |
| 2005/0066286 A1 * | 3/2005 | Makela | 715/764 |
| 2005/0195221 A1 * | 9/2005 | Berger et al. | 345/660 |

* cited by examiner

*Primary Examiner*—Stephen Hong
*Assistant Examiner*—Boris Pesin
(74) *Attorney, Agent, or Firm*—Workman Nydegger

(57) ABSTRACT

A system and method for small computing devices that present a thumbnail image of content such as a web page, allows a viewer to select a region, and zooms in on the selected region in a way that reduces scrolling and helps users to understand the content they are reading. The page is scaled such that a user need only scroll in one dimension to see the content, and is divided into regions. Regions may be arranged as cells of a grid, or arranged by logically-related content. A user navigates among the regions as desired, selects a region from the thumbnail view, and obtains an expanded version of that region. In the expanded view, the region is ordinarily scaled so that the user scrolls in only one dimension to view the content of the region. Browser "Back" commands are supported, as are frames.

17 Claims, 8 Drawing Sheets

METHOD AND SYSTEM FOR IMPROVED VIEWING AND NAVIGATION OF CONTENT

FIELD OF THE INVENTION

The invention relates generally to displaying content such as web pages, particularly on mobile computing devices including computers and mobile telephones.

BACKGROUND

Mobile computing devices such as personal desktop assistants, contemporary mobile telephones, hand-held and pocket-sized computers, tablet personal computers and the like, are becoming important and popular user tools. In general, they have become small enough to be extremely convenient, while consuming less battery power, and at the same time have become capable of running more powerful applications.

Such devices are able to connect to networks, including the Internet. Contemporary mobile devices such as a PocketPC thus may present web pages to users. Likewise, mobile telephones such as those running Microsoft® Smartphone software allow users to make conventional mobile telephone calls and also access the Internet, as well as send and receive e-mails and files, store contacts, maintain appointments and do many other things contemporary computers can now do.

While the network connectivity features of such devices provide a number of benefits, their small screen size leads to a number of problems. For example, one of the fundamental difficulties with web browsing on mobile devices today is presenting web content on the small screen of a mobile device in a way that users can easily use and understand. At the source end, content providers may not know the type of devices that are accessing their site, but even if they did, many would not provide different page layouts based on each type of device. At the receiving end, shrinking the size of an existing website page to fit a small screen makes the page content too small to be easily viewed. As a result, devices with small screens are arranged to show only a portion of the page at a time, and provide horizontal and vertical scrolling mechanisms for the user to move around, which is essentially like shifting the content around behind a small, fixed viewing aperture.

However, requiring the user to scroll in two dimensions to read content is not a very desirable solution. This is because users easily get lost and are otherwise confused as to where they are positioned within a page. Also, lines of text that are wider than the screen becomes difficult to read, as the user has to scroll to the right to finish reading one line of text, and all the way back left to begin reading the next line. In sum, small devices do not match up well with conventionally-provided web content.

SUMMARY OF THE INVENTION

Briefly, the present invention is directed towards a system and method implemented in part in an improved user interface that presents a thumbnail image of a content such as a web page, allows a viewer to select a region, and zooms in on the selected region in a way that reduces scrolling and helps users to understand the content they are reading, particularly on devices having relatively small displays areas. To this end, in one implementation the page of content is scaled such that a user need only scroll in one dimension to see the content. While displayed in the reduced-size (zoomed-out) thumbnail representation, the content is arranged as a set of distinct regions for selection. A user navigates among the regions as desired, selects a region from the thumbnail view, and obtains an expanded version of that region.

Thus, in the zoomed-out version of the content, the user sees the content (e.g., a web page) as a whole. In one alternative implementation, the content is divided into panelized regions, or panels, having content that is general is logically-related, by analyzing the content document. In another alternative implementation, the regions are based on physical location by logically placing each region into a cell of a grid. The user navigates among the regions to zoom in on an individual region. A user zooms in on the content in a desired cell by navigating to the cell and selecting it.

In general, this allows the user to scroll less to view desired content, and scroll with more confidence which is desirable on a small device such as a mobile telephone or pocket-sized personal computing device. Various buttons, keys and/or icons are provided that allow a user to control the operation of the device, which may include a four-way navigation button that detects left, right, up and down movements, and also detects a user's tapping action. Other buttons may include a "Home" button and a "Back" button.

While in the thumbnail viewing state, the user navigates among the panels using the buttons, keys and/or icons. While moving around among the panels, some visual indication (a cursor) is given as to which panel the user is currently residing on and would select for zooming, such as by tapping the navigation button. Because the thumbnail view is relatively small, a tooltip or the like may be arranged to pop up and give the user some context as to what content is in the focused panel.

When the user selects a panel, the selected panel is presented on the screen in place of the thumbnail view, with the selected panel ordinarily sized such that the user only need scroll either horizontally or vertically, but not both, in order to view the contents of that panel. If the user scrolls in the other dimension, the user may moves to a different panel. Also, if a user moves beyond a limit in one-dimension, that is, requests to move past the end of a panel, the user may move to a different panel. Some visual indication may be provided to the user to give the user some context of a panel change.

The system maintains a "Back" list, or stack, so that when the user selects a "Back" button, the display will return to an earlier state. In one implementation, any thumbnail is added to a back stack, such that when the user is zoomed in on a page and presses back, it returns the user to the thumbnail view. The location of the cursor in the thumbnail is preserved. The thumbnail view will not, however, be added to the browser's history. When a web page or a program executes a back operation, it will move back to the previous page. Various other alternatives for handling the Back command are feasible.

Pages of content divided into frames are also handled. In general, frames will show the contents for each frame and will be treated as distinct regions. Unlike regions however, in one implementation a selected frame does not change to another frame by directional navigation commands; instead frames are only selectable from the thumbnail view.

Other advantages will become apparent from the following detailed description when taken in conjunction with the drawings, in which:

DETAILED DESCRIPTION

Exemplary Operating Environment

Figure 1:
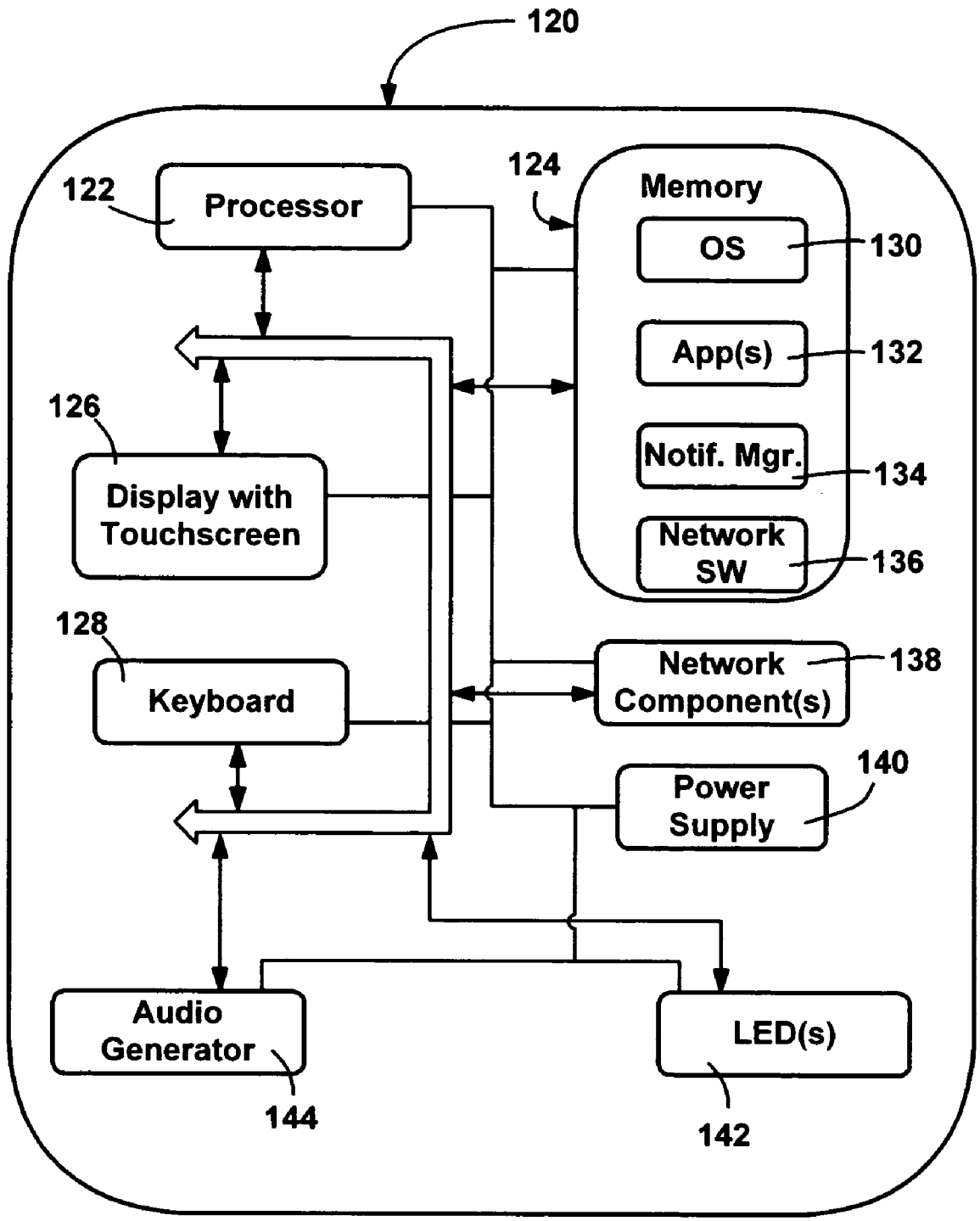
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Improved Content Viewing and Navigation

The present invention is generally directed towards viewing pages of content, particularly on small display screens such as present on mobile computing devices and/or mobile telephones. As will be understood, however, the present invention is not limited to any type of computing device, and may, for example, be used with a relatively large display, such as to assist visually-impaired users, assist web page designers in arranging content to be viewed on small devices, and so forth. Moreover, the present invention is not limited to viewing only web content, but can also be applied to any structured document, including word processing documents, spreadsheets and so forth. As used herein, the term "content" refers to any document having some structure that can be analyzed and separated into regions.

Figure 2:
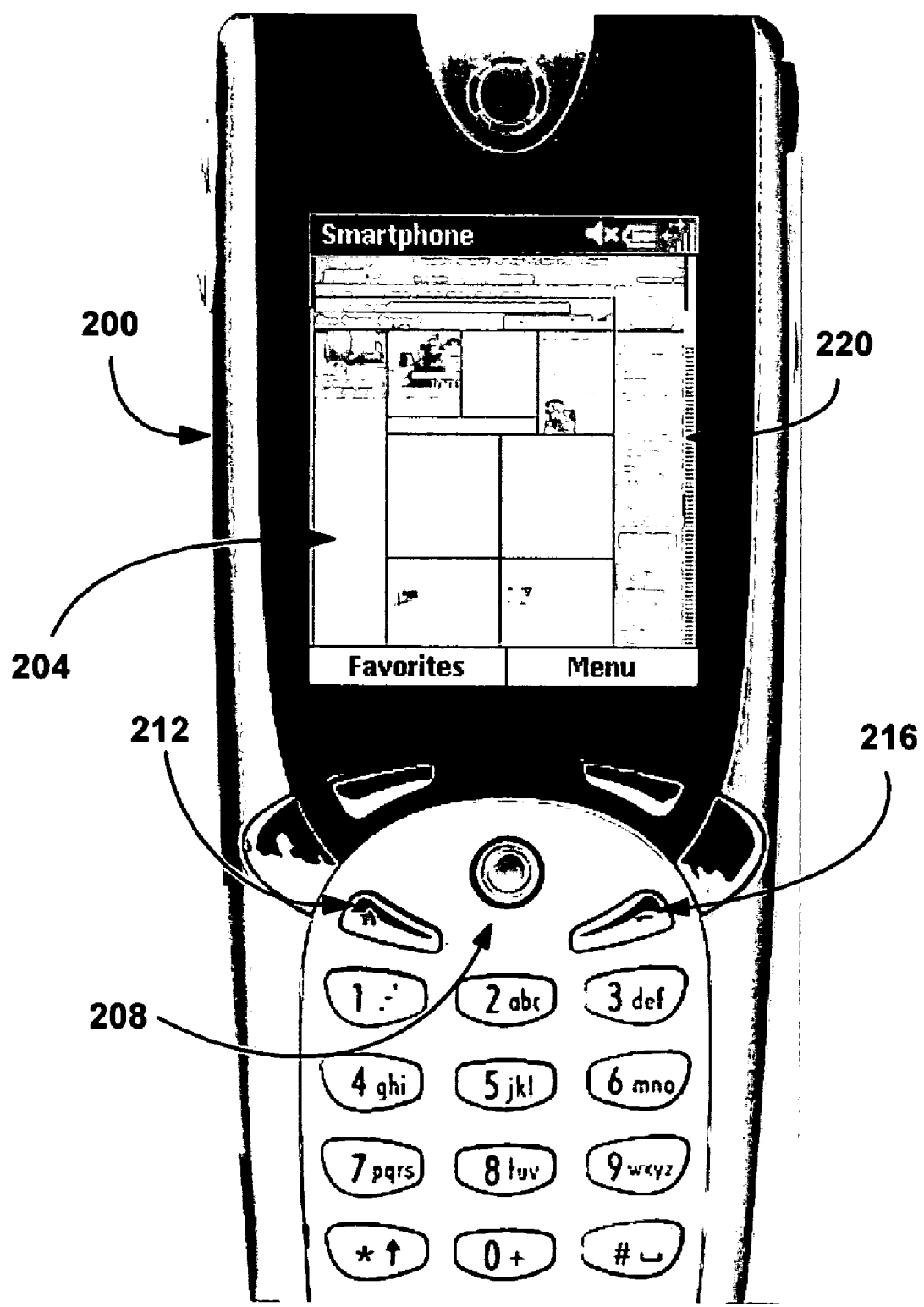
FIG. 2 is a representation of a mobile telephone constructed in accordance with an aspect of the present invention, including a mechanism for displaying content in a panelized manner.

Turning to FIG. 2, there is shown a mobile telephone and computing device 200 having a display 204. As described below, the device 200 includes browser software and is thus capable of presenting content including web pages and the like to users. Various buttons/keys are provided that allow a user to control the operation of the device 200, including a four-way navigation button 208 that detects left, right, up and down movements, and also detects a user's tapping action. Other buttons include a "Home" button 212 and a "Back" button 216. As can be readily appreciated, via the buttons the user can navigate among content such as provided in web pages.

In accordance with an aspect of the present invention and as generally represented in FIG. 2, in one implementation, when a user requests a page, the entire page is presented in a thumbnail view. Ordinarily, the thumbnail view is scaled such that screen shows the entire width of the page. One way to scale pages is described in U.S. patent application Ser. No. 10/404,209 entitled "System and Method for Scaling Images to Fit a Screen on a Mobile Device According to a Non-Linear Scale Factor," assigned to the assignee of the present invention and hereby incorporated by reference.

In this way, only vertical scrolling is necessary, as indicated by the amount of scroll indicator 220. For example, with a suitable device, the page will be rendered assuming a window width of 800 pixels, and the page will be scaled down to fit the current screen width, e.g., 800/Screen Width. Note that if necessary, in cases where a page renders wider than 800 pixels, the thumbnail will horizontally scroll. The following table shows one example implementation of how the thumbnail is scaled at various device resolutions:

| Screen Orientation | Screen Width | Screen Height | Scaling Factor |
| --- | --- | --- | --- |
| Pocket PC Portrait | 240 | 320 | .3 |
| Pocket PC Square | 240 | 240 | .3 |
| Pocket PC Landscape | 320 | 240 | .4 |
| Smartphone | 176 | 220 | .22 |
| QVGA Smartphone | 240 | 320 | .3 |
| Pocket PC High DPI | 480 | 640 | .6 |
| Pocket PC High DPI Landscape | 640 | 480 | .8 |

Note that at a high resolution, the thumbnail would only be a marginal magnification from the natural screen resolution. However, the default zoom level (Medium) shows the page as if the screen is 96 dpi, allowing users to still benefit from the thumbnail by default. If a user wants to view the page smaller, the user has the option to change the zoom level and turn off the thumbnail.

Figure 3:
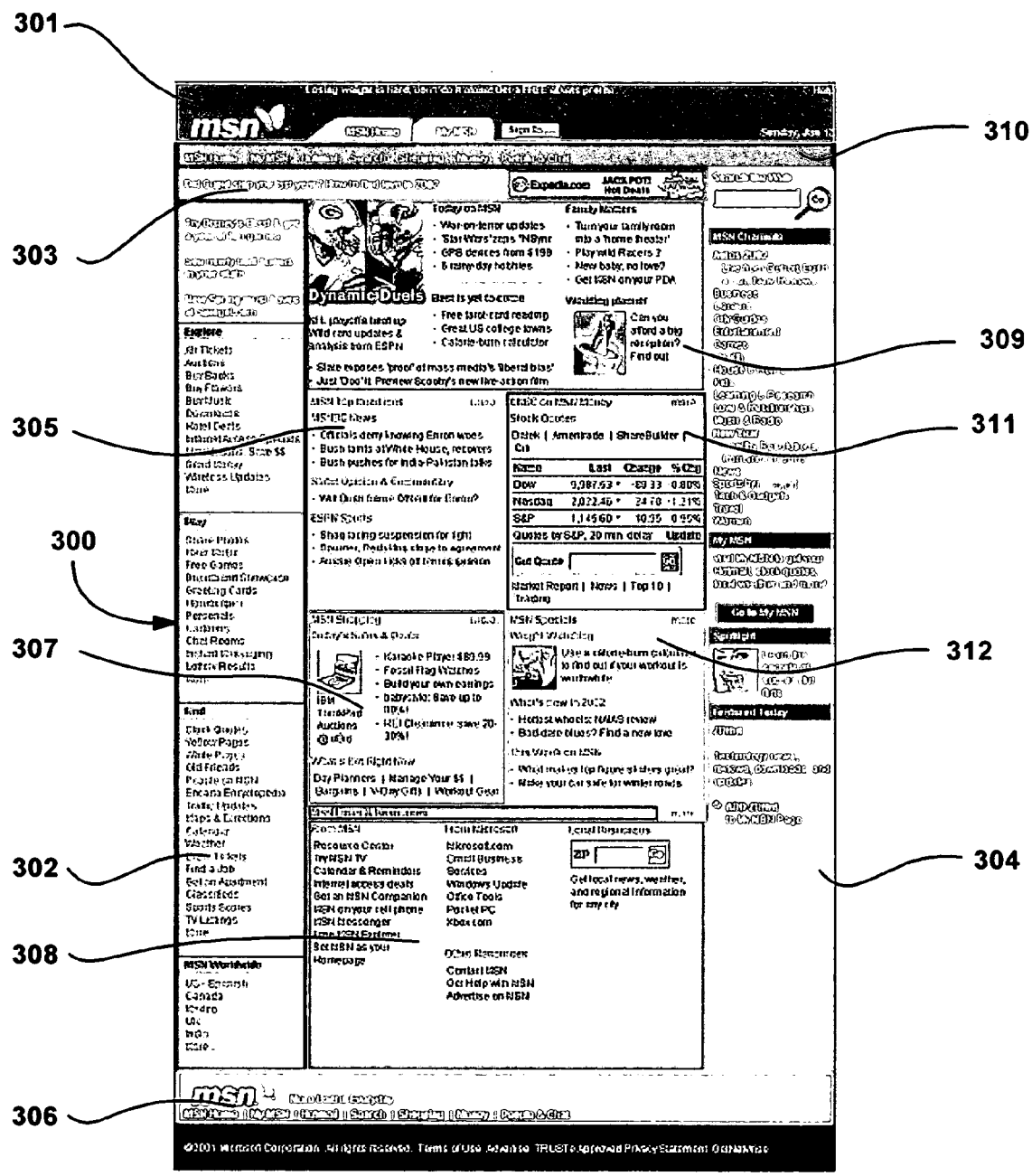
FIG. 3 is a representation of content panelized into regions in accordance with an aspect of the present invention.

In accordance with an aspect of the present invention and as generally represented in FIG. 3, in one implementation, a page 300 of content may be divided up into various regions, or panels 301-312, and the user provided with a mechanism to navigate among the panels. One technique for doing so, by analyzing the (e.g., HTML) content, is described in U.S. patent application Ser. No. 10/306,729 entitled "Small Form Factor Web Browsing," assigned to the assignee of the present invention and hereby incorporated by reference. In general, because of the way in which page designers lay out the content within HTML, each panel typically contains items of content that are logically related to one another in some way, e.g., the panel 302 contains a list of useful links, the panel 305 contains a links to current news and sports items, and so on. Note that it is feasible for a page designer to insert a "mobile-optimized" tag around content to guide the mechanism in panelizing content in accordance with the designer's instructions.

While in the thumbnail viewing state, the user uses the navigation button 208 to move among the panels until one is selected by tapping the navigation button 208. While moving around among the panels, some visual indication is given as to which panel the user is currently residing on and would select if the navigation button 208 was tapped, that is, which panel has "focus" (but has not yet been selected for zooming). For example, the panel may be surrounded by a visibly distinct (e.g., colored) border; a dark border is shown around the panel 305 in FIG. 4. Other alternative and/or secondary indicators are feasible, e.g., the panel having focus (or its border) could flash, the panel could be slightly enlarged relative to others, and so forth. Note that settings such as the color scheme may be user configurable. Other things that may be user configurable include sizing of the panels, as well as the option to turn off the functionality and scroll in two-dimensions in the conventional manner, or otherwise navigate the content in some other manner.

Figure 4:
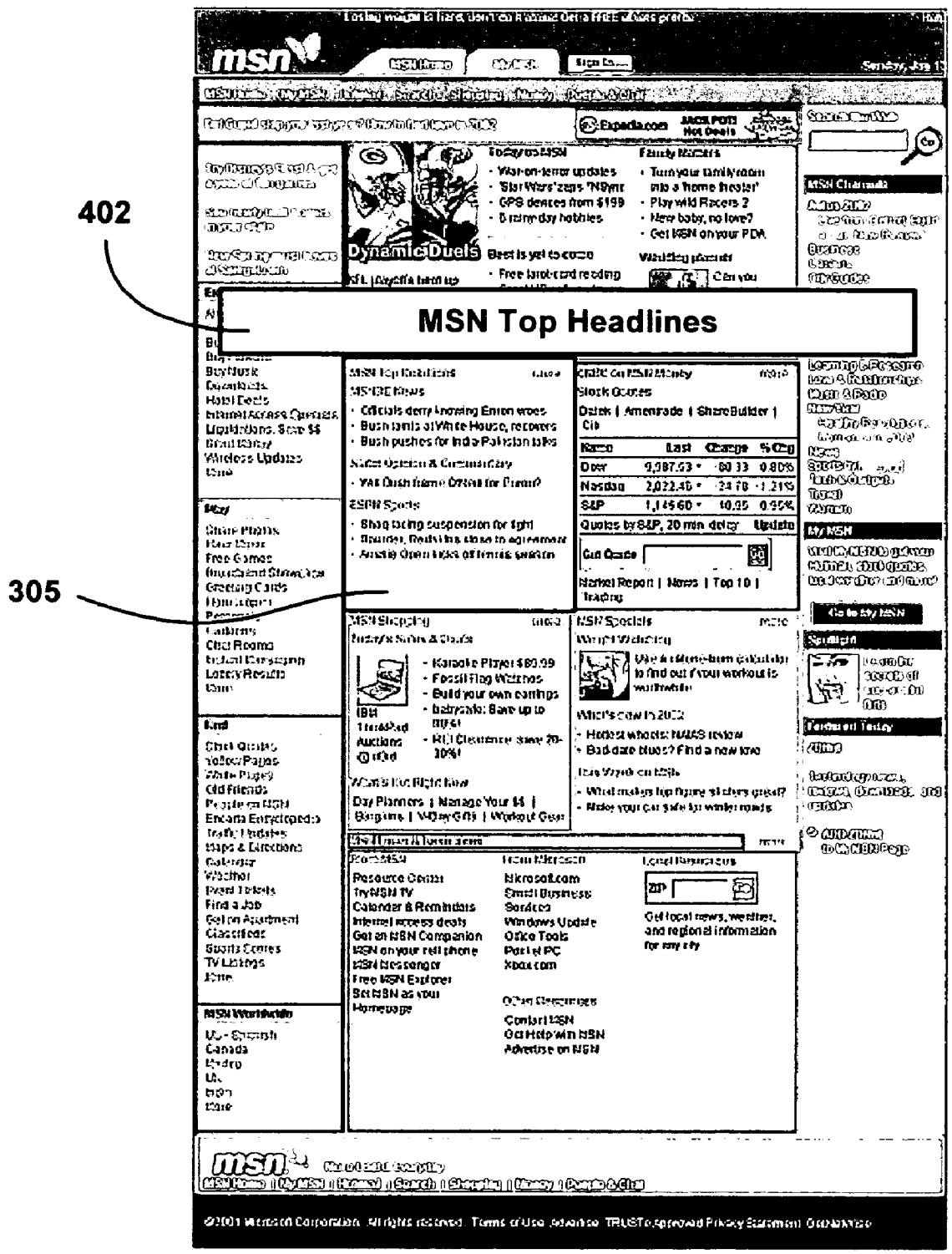
FIG. 4 is a FIG. 3 is a representation of a tooltip that can appear when navigating over a panelized region of content, in accordance with an aspect of the present invention.

To facilitate proper selection of a desired panel, other mechanisms may be provided. For example, because the thumbnail view is relatively small, the actual text in the panel might not be readable to know what is in the panel prior to selecting it. To help the user, a tooltip or the like may be arranged to pop up and give the user some context as to what content is in the focused panel. In the example of FIG. 4, the panel 305 has been selected, and a tooltip 402 is popped-up to show the user the text of the first line of text of that panel.

Figure 5:
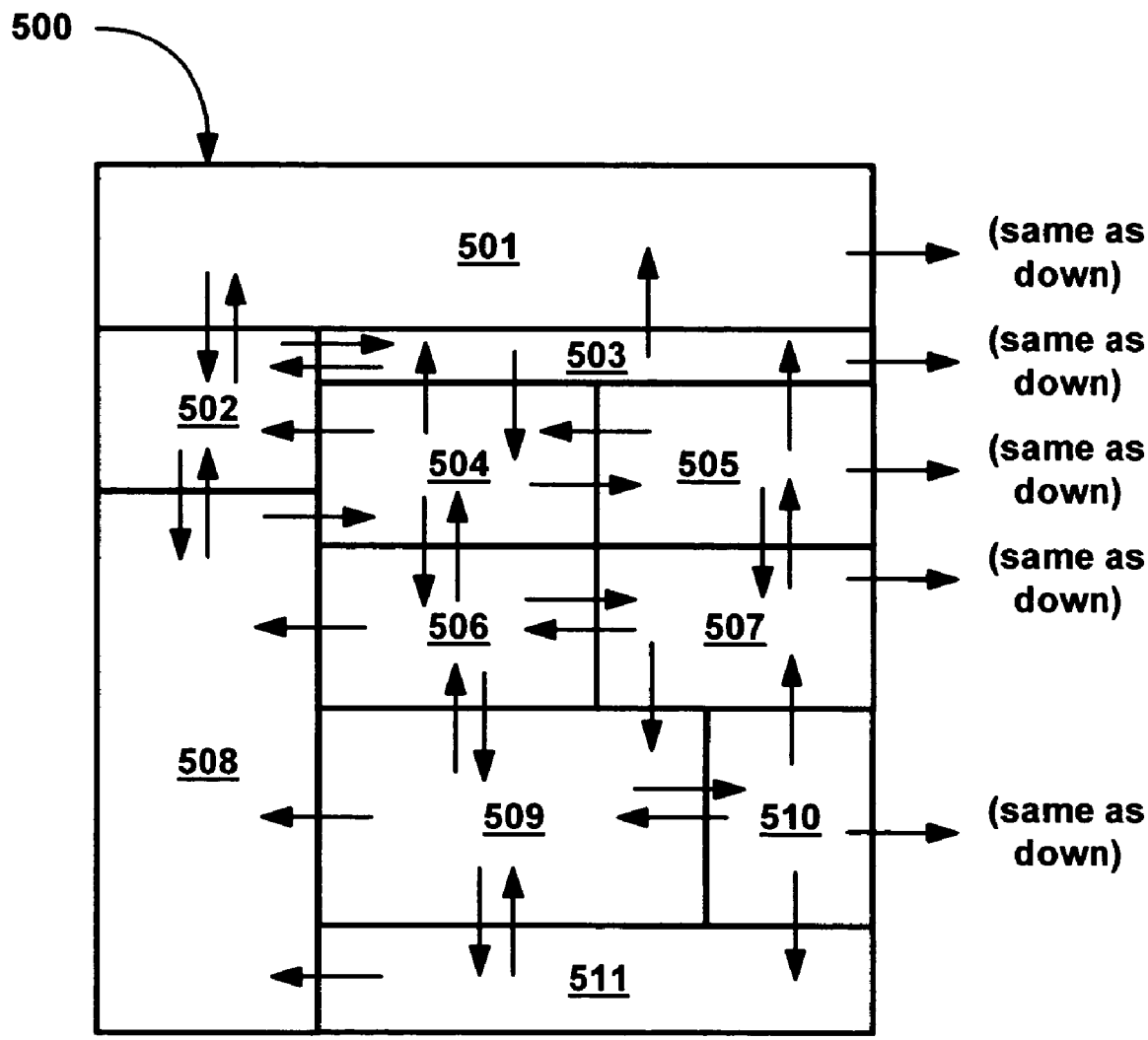
FIG. 5 is a representation of how panelized regions may be navigated via four-way navigation commands, in accordance with an aspect of the present invention.

FIG. 5 represents example content that has panelized into panels 501-511. In general, within the thumbnail view, one way in which navigation among the panels may take place is represented by the arrows in FIG. 5, which correspond to four-way navigation commands. As can be readily appreciated, any suitable algorithm, such as one based on the coordinates of the panels, can be used to determine which panel to switch to when a directional button is detected. Note that for consistency, some set of rules is needed when a panel has a number of possible options. For example, in FIG. 5, the panel 508 can move rightward to another panel, but there are four possibilities (panels 504, 506, 509 and 511). Thus, a rule such as, if more than one option, move to the topmost when moving right or left, or leftmost if moving up or down, provides such consistency. Further, note that nonsensical commands may be ignored when at a panel that extends to the edge of the display, e.g., a left command when in panel 502 does not make sense and thus may be ignored. However, a right command when at the right edge may be treated as a down command, if desired, or something else, such as move to the leftmost panel and then down.

In accordance with an aspect of the present invention, when the user selects a panel, the selected panel is presented on the screen in place of the thumbnail view, with the selected panel ordinarily sized such that the user only need scroll either horizontally or vertically, but not both, in order to view the contents of that panel. Moreover, within the panel, the user does not necessarily scroll in the traditional, smooth linear manner via (left-right or up-down) scroll-bars, but can navigate to subparts within that panel. For example, when on a highlighted link, the highlight will jump to the next link when the down button or right button is actuated, or go back to the previous link when the up button or left button is actuated. However, displayed text may scroll as usual with the navigation buttons.

Thus, in general, the scrolling within a panel may be linearly smooth as with traditional scroll bars, such as when reading text, or may instead jump, such as when the user has scrolled to one link in a panel and moves to the next link in the same panel. If the user scrolls in the other dimension, (that is, horizontally when in a vertically scrolling panel or vice-versa), then in general, the user moves to a different panel. Also, if a user moves beyond a limit in one-dimension, e.g., asks to move down when already at the bottom of the panel, the user may move to a different panel. In other words, when scrolling within a panel, when a navigation command would send the view beyond the scrolling boundary, the next panel in that direction may be presented to the viewer. Note that a simple way to determine the next panel is to follow the rules that are used when navigating in the thumbnail view, however it is feasible to use different rules. For example, returning to FIG. 5, a user that is at the bottom of the panel 508 and requests to go right may expect to be transferred to panel 511, not panel 504. Again, by using the panels' bounding coordinates and the coordinates of where the user is positioned within a panel, the commands can be interpreted and acted on in a way that the user likely intends.

Note that when switching between panels, some visual indication may be provided to the user to give the user some context of what has occurred. For example, the color could be made to change such as via a mostly transparent overlay, possibly for some limited time, the new panel could flash for awhile, and so on. Alternatively, when changing a panel, the thumbnail view could briefly reappear, with the new panel highlighted, before presenting the newly selected panel. The temporary thumbnail view could be transparent, shown in reduced size and/or expand and contract in an animated fashion as it is presented to the user. Essentially any visual effect including animations may be employed to help the user recognize that a new panel has been selected.

Figure 6:
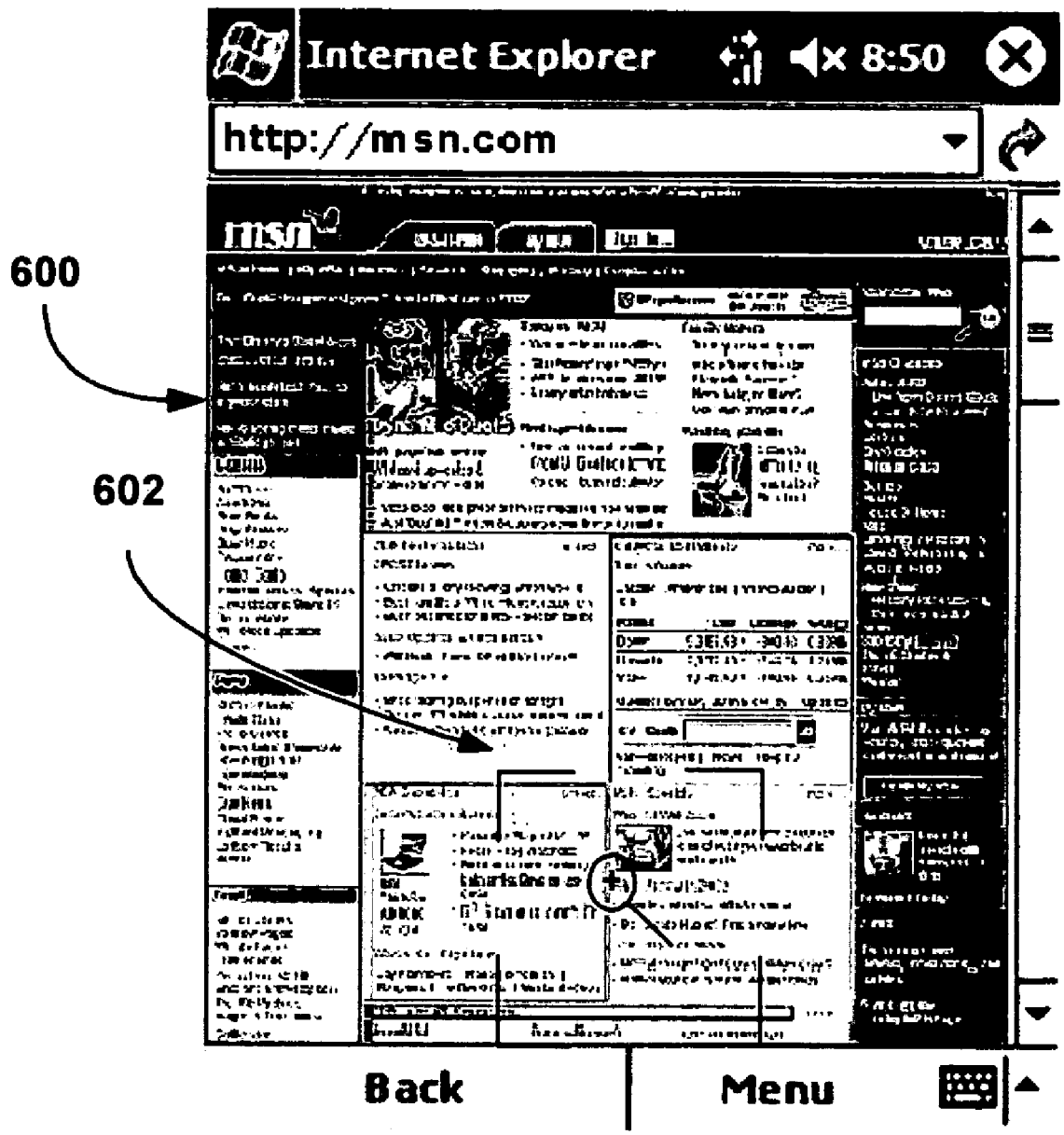
FIG. 6 is a representation of content logically separated into a zooming grid, in accordance with an aspect of the present invention.

In accordance with another aspect of the present invention, as represented by the image 600 in FIG. 6, another alternative divides a thumbnail-presented page into some number of regions, (e.g., nine), the four corners of which are shown as a grid framing marker 602. The center may be marked with a magnifier to convey to the user that it is possible to zoom in on that region. Note that in one scheme, the same number of regions, nine, is used in the various screens and resolutions.

The nine regions on the screen facilitate very fast navigation around the page and selection of a region within the thumbnail. With a telephone device, it also allows the user to use the keypad to quickly navigate to a region, e.g., each of these regions may be quickly navigated to and/or selected, e.g., by using digits one through nine on a telephone keypad. Tapping a touch-sensitive screen is another way to navigate, particularly for devices that do not have keypads. Once a region is thus moved to, that region may be selected and zoomed in on, that is, the region is expanded to cover most of the screen.

When zoomed in, a number of ways to notify the user of the zoomed state may be used. For example, the selection icon (if any) may disappear, and the magnifier is no longer shown on the screen. If zooming on a rectangle, an animation may occur, starting from the point of selection, to provide feedback that a region has been selected. When zoomed into a normal page, the page appears at its normal size, with the element the user selected shown one-quarter from the top of the screen, centered. No justification change is necessary. The zoom can function with various other viewing options.

For devices having a numeric keypad, such as on a mobile telephone, a number may be displayed within the currently marked region indicating which key, if pressed, will zoom in that region. For example, such a number may appear inside the lower right corner. Note that the above frame, magnifier and any numeric elements will have some noticeable color scheme, such as black with a white border, to maximize reading on any web site, with an emphasis on readability in web sites with light colored backgrounds.

Although the thumbnail in landscape is wider, it still shows the same amount of content on the page and therefore should have the same number of regions. The scroll location for each region is determined with the following formulae; the result is the fraction of the screen size that the upper left corner of the cursor should move to and then zoom in on if the user presses action:

Horizontal: (N−1)%3/3

Vertical: Floor(N−1/3)/3

The following table lists key assignments in one example implementation:

| Item | Description |
|---|---|
| Up/Down/ Left/Right | Traverse thumbnail up, down, left and right. Each motion moves the selection icon to the next region in the indicated direction. Pocket-sized PC (PPC) Initially there is no selection icon on the screen. Once the user presses the D-Pad, it makes the magnifier appear in the default location and function as indicated for telephone above. Scrolling If the selection UI is on the last visible row on screen, and the user presses down, the thumbnail scrolls down enough to display the entire next region. The converse behavior occurs when at the top of the screen and the user presses up. If the thumbnail needs to scroll horizontally, there will be similar behavior to the above when pressing left/right. |
| Action/Tap | Performs a zoom operation. Exception: The first press of action on PPC makes the magnifier appear. |
| */# | Performs a page up/down operation, respectively. |
| 1-9 (telephone or PPC Keyboard) | Shortcut Jump - Jumps the magnifier to the upper left of the region associated with that number. Zoom - Performs a zoom. |
| Back (SP) or SK1 Back (PPC) | Returns to the zoomed in area of the previous page |

In accordance with another aspect of the present invention, action is taken when the user selects a "Back" button (or taps a "Back" icon). In general, in one implementation, any thumbnail is added to a Back stack. If the user is zoomed in on a page and presses Back, it returns the user to the thumbnail view. The location of the cursor in the thumbnail is preserved. The thumbnail view will not, however, be added to the browser's history. When a web page or a program executes a Back operation, it will move back to the previous page.

Figure 7:
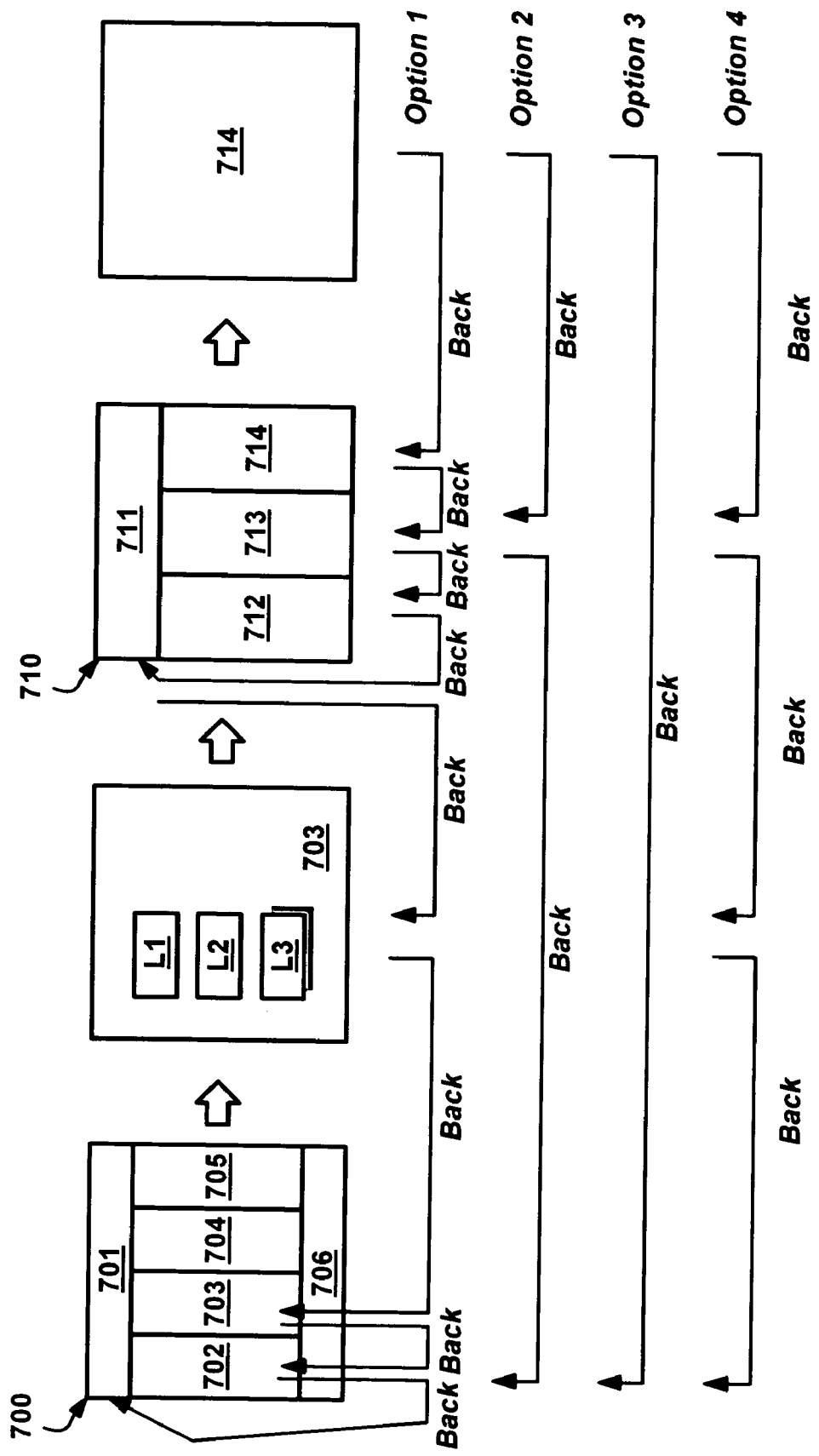
FIG. 7 is a representation of various options for how panelized regions may be navigated via a Back command, in accordance with an aspect of the present invention.

FIG. 7 represents a number of alternative ways in which the Back stack can be maintained. In general, a user starts with the thumbnail view 700, and navigates to panels 701, 702 and then to panel 703. Then, panel 703 is selected, providing links L1-L3. The user selects a link, e.g., L3, which takes the user to page 710, which is also shown as a thumbnail view, and divided into panels. From panel 711, the user navigates to panel 714 where, for example, text content is displayed.

One option, option 1 in FIG. 7, simply puts everything on the stack, where the user would get the exact navigation path back. However, this causes the user to have to hit Back many times to move the cursor over panels that were not selected, but were only in the navigation path. Thus, other options would likely be more desirable.

Option 2 takes the user back from the page 714 to the thumbnail view 710, with a second Back command taking the user to the original thumbnail view 700. Option 3 takes the user straight from the page 714 to the original thumbnail view 700. Option 4 leaves out from the Back stack any item in the navigation path that was navigated over without being selected. These options may be user configurable, and others are feasible.

Another aspect of the present invention deals with pages already divided into frames. In general, frames will show the contents for each frame, however with frame pages and the nine-grid alternative, the selection UI shows and moves from frame to frame, instead of from region to region on a grid. The selection UI is around the entire frame. Thus, frames are treated like the divided panel alternative, except that the frame author essentially defines the panel. Also, only one frame is on screen; when the user presses action on a thumbnail, it shows a particular frame. The entire page is loaded, but the user can only scroll within that frame. Further, the user uses the thumbnail to move between frames. That is, to display another frame, the user presses "Back" to get the thumbnail and can then take an action on the desired frame. Frames pages on the telephone device may be set to always display the thumbnail, regardless of the thumbnail setting. Further, frames pages are set to use the thumbnail on the telephone device even if a "mobile-optimized" tag is in the page.

It should be noted that when dealing with frames, panelized regions and/or grid regions, the present invention is capable of providing a thumbnail view within a zoomed-in region. In other words, when selected, a region can be further divided into sub-regions. Note that a page designer can instruct the device on how this can be done, e.g., via a mobile-optimized tag, or the (e.g., browser) code can decide that the content within a region is sufficiently complex to warrant further dividing a region into sub-regions.

Example Architecture

Figure 8:
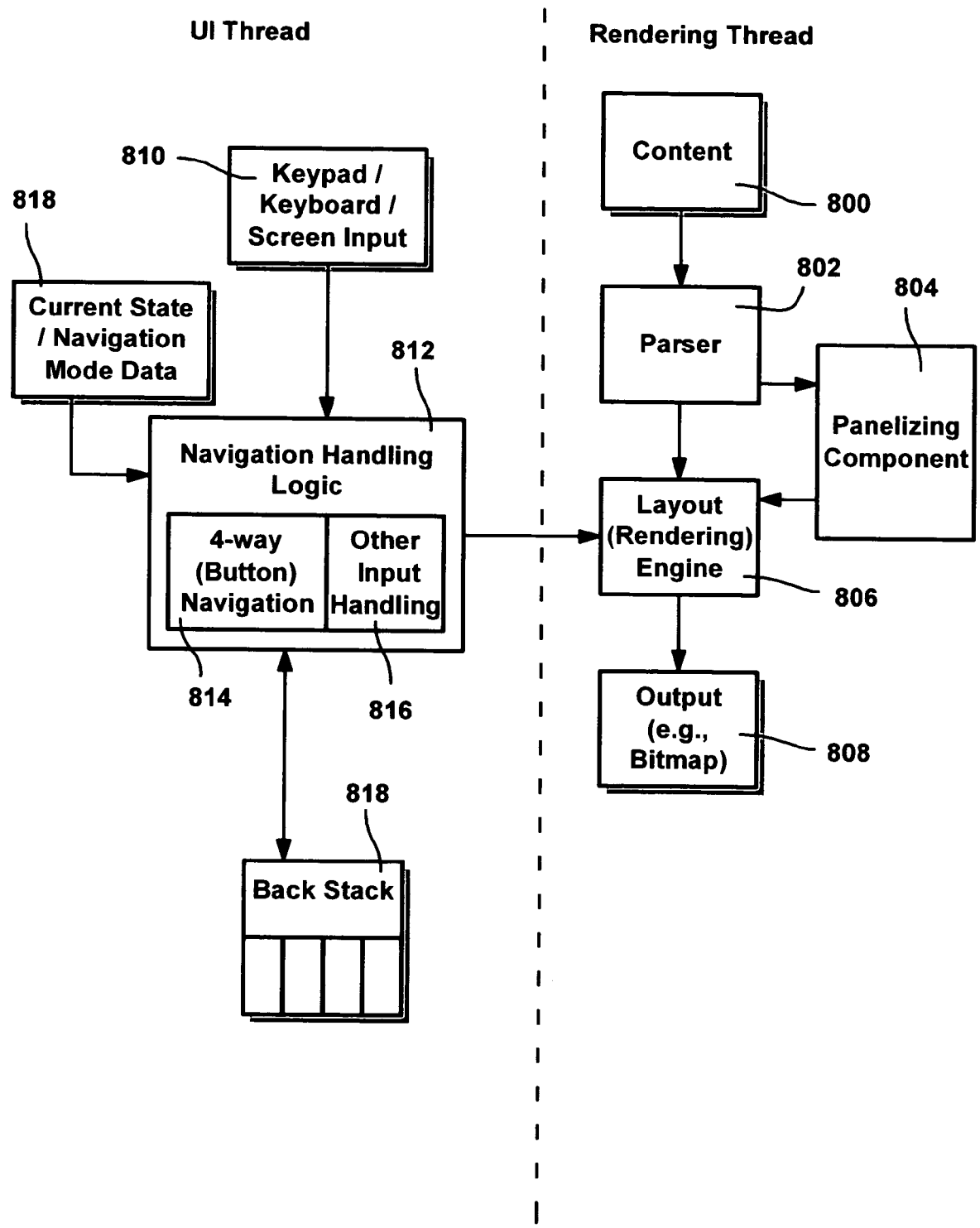
FIG. 8 is a block diagram representing an example architecture in which the present invention has been incorporated.

FIG. 8 shows one way in which the present invention may be implemented into a device, generally in the browser code. Other content such as spreadsheets and word processing documents can be analyzed in an appropriate location, such as in the program code.

In general, a rendering thread takes received content and parses it, such as for purposes of progressive rendering. For content that is to be divided into panels, a panelizing component 804 (e.g., as described above and in the aforementioned "Small Form Factor Web Browsing" U.S. patent application Ser. No. 10/306,729) processes the content into the various panels and provides the content to a layout/rendering engine 806. The layout/rendering engine 806 outputs the content as a bitmap for display. Although not shown, the layout engine 806 also needs to know any settings that are user configurable, such as color schemes and the like, to display each image as appropriate for the user.

A user interacts with the browser components on a UI thread, such as by sending keypad, keyboard and/or touch-screen-based commands 810 to navigation handling logic 812. Such logic may include rules 814 for handling four-way navigation, and other input handling rules 816, e.g., "Home" commands, "Back" commands, 0-9 commands, Tab commands and so forth. Based on the current state 818 of display, e.g., thumbnail or zoomed-in, and where the user is positioned in the image when an input command is received, the logic scrolls or jumps appropriately, as generally described above. Such data also may include current navigation mode data (e.g., whether operating in the nine-grid region alternative, the panelized region alternative or under some other setting). A stack 818 for going back in response to the "Back" button is also maintained, as generally described above with reference to FIG. 7.

As can be seen from the foregoing detailed description, there is provided a method and system for improved viewing and navigation of content that is particularly useful on devices having small display areas. The method and system enable viewers to rapidly and intuitively locate desired content within a structured document such as a web page. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a mobile computing device having limited display capabilities, a method for displaying a full readable content page despite the limited display capabilities of the mobile device, the method comprising:

dividing a page of content into a plurality of regions;

displaying the plurality of the regions of the page of content together as a thumbnail and in a reduced size on a display of a mobile computing device;

detecting a request to display a selected one of the regions;

replacing the thumbnail on the display by displaying the selected region in a size that is expanded relative to the reduced size of the selected region in the thumbnail;

from the displayed selected region in the expanded size, detecting a request to display a second region of the plurality of regions of the content page and determining which of the plurality of regions is the second region, the second region having been displayed in the thumbnail and excluded from the selected region displayed in the expanded size;

in response to after detecting the request to display the second region that is excluded from the selected region and determining which of the plurality of regions is the second region, temporarily re-displaying the thumbnail on the display, wherein the temporarily displayed thumbnail now highlights the newly selected second region when the thumbnail reappears; and after temporarily displaying the thumbnail following selection of the second region, displaying the second region on the display in a size that is expanded relative to the reduced size of the second region in the thumbnail.

2. The method of claim 1 wherein dividing the content into the regions comprises providing a navigation grid having a plurality of regions which can each be navigated to via navigation commands.

3. The method of claim 1 wherein dividing the content into the regions comprises panelizing the content into panelized regions.

4. The method of claim 1 further comprising, providing a tooltip that is based on the content of a region that is being displayed in the reduced size.

5. The method of claim 1 wherein displaying the selected region in the expanded size comprises scaling the selected region such that its content can be viewed by scrolling in only one dimension.

6. The method of claim 5 wherein detecting a request to display a second region comprises scrolling in a second dimension, wherein scrolling in a second dimension is indicative of a request to change the displayed region from the previously selected region to another region.

7. The method of claim 6 further comprising, providing a visual indication of the change of regions.

8. The method of claim 5 wherein scrolling in the one dimension beyond a limit in the region changes the displayed region from the previously selected region to another region.

9. The method of claim 8 further comprising, providing a visual indication of the change of regions.

10. The method of claim 1 further comprising, when the regions are displayed together in a reduced size, providing a cursor that indicates which region will be selected as the selected region upon detecting the request to display one of the regions.

11. The method of claim 10 wherein dividing the content into the regions comprises providing a navigation grid having a plurality of regions which can each be navigated to via navigation commands, and wherein the cursor is provided as a grid framing marker.

12. The method of claim 1 wherein dividing the content into the regions comprises panelizing the content into panelized regions, and wherein providing the cursor comprises marking a border around a panelized region.

13. The method of claim 1 wherein displaying the regions in the reduced size comprises scaling the regions such that the regions can be viewed by scrolling in only one dimension.

14. The method of claim 1 further comprising, receiving the content as a web page.

15. The method of claim 1 further comprising scrolling within the selected region.

16. The method of claim 15 wherein scrolling within the selected region comprises jumping between two links based on a single directional command.

17. In a mobile phone having computing capabilities and limited display capabilities on a display, a method for displaying a full readable Web content page despite the limited display capabilities of the mobile device, the method comprising:

dividing a page of content into a plurality of regions, the page being accessible by the mobile phone over the Internet;

displaying the plurality of the regions of the page of content together as a thumbnail and in a reduced size on the display of the mobile phone, such that all of the plurality of regions are displayed and such that each of the plurality of regions is individually selectable on the thumbnail;

receiving user input selecting a particular region of the plurality of regions;

detecting a request to display the particular region of the plurality of regions selected by the user;

in response to detecting the request to display the particular region, replacing the thumbnail on the display by displaying only the particular region and in a size that is expanded relative to the reduced size of the content region in the thumbnail, such that the displayed particular region consumes substantially the entire display of the mobile phone, and wherein only a portion of the particular region consumes the entire display and additional portions are available by scrolling in only a single, predefined direction;

receiving user input in the predefined direction and, in response, scrolling to the additional portions of the particular region;

from the displayed selected region, detecting user input in a direction perpendicular to the predefined direction and, in response determining that the use input is a request to display a second region of the plurality of regions of the content page;

determining which of the plurality of regions is the second region, the second region having been displayed in the thumbnail and excluded from the particular region displayed in the expanded size;

after determining which of the plurality of regions is the second region, temporarily re-displaying the thumbnail on the display, wherein the temporarily displayed thumbnail, when it reappears on the display, now highlights the newly selected second region; and after temporarily displaying the thumbnail following selection of the second region, displaying the second region on the display in a size that is expanded relative to the reduced size of the second region in the thumbnail.

* * * * *